(12) United States Patent
Kwasniewski et al.

(10) Patent No.: US 7,366,688 B2
(45) Date of Patent: Apr. 29, 2008

(54) SYSTEM FOR PROCESSING APPLICATIONS FOR MANUFACTURE OF VEHICLE PARTS

(75) Inventors: Dale Kwasniewski, Galesburg, MI (US); James Kendzior, Kalamazoo, MI (US); Rachel Lahr, Portage, MI (US); Yogesh Deo, Kalamazoo, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 480 days.

(21) Appl. No.: 10/647,171

(22) Filed: Aug. 22, 2003

(65) Prior Publication Data
US 2005/0044002 A1  Feb. 24, 2005

(51) Int. Cl.
*G06Q 30/00* (2006.01)
(52) U.S. Cl. ........................................ 705/26
(58) Field of Classification Search ............... 705/26, 705/27
See application file for complete search history.

(56) References Cited

U.S. PATENT DOCUMENTS

| | | |
|---|---|---|
| 5,694,551 A | 12/1997 | Doyle et al. |
| 5,758,327 A | 5/1998 | Gardner et al. |
| 5,839,117 A | 11/1998 | Cameron et al. |
| 5,970,475 A | 10/1999 | Barnes et al. |
| 6,044,362 A | 3/2000 | Neely |
| 6,047,264 A | 4/2000 | Fisher et al. |
| 6,055,516 A | 4/2000 | Johnson et al. |
| 6,125,352 A | 9/2000 | Franklin et al. |
| 6,141,653 A | 10/2000 | Conklin et al. |
| 6,343,275 B1 | 1/2002 | Wong |
| 2001/0014878 A1 | 8/2001 | Mitra et al. ............ 705/39 |
| 2001/0027423 A1 | 10/2001 | Clonts et al. ............ 705/26 |
| 2001/0042026 A1 | 11/2001 | Hinh et al. ............ 705/26 |
| 2001/0047307 A1 | 11/2001 | Bennett et al. ............ 705/26 |
| 2001/0047332 A1 | 11/2001 | Gonen-Friedman et al. .. 705/40 |
| 2001/0049644 A1* | 12/2001 | Webb et al. ............ 705/27 |
| 2001/0051905 A1 | 12/2001 | Lucas ............ 705/29 |
| 2002/0007318 A1 | 1/2002 | Alnwick ............ 705/26 |
| 2002/0026373 A1 | 2/2002 | Kamath et al. ............ 705/26 |
| 2002/0032573 A1 | 3/2002 | Williams et al. ............ 705/1 |
| 2002/0040328 A1* | 4/2002 | Reichwein et al. ............ 705/26 |
| 2002/0042750 A1 | 4/2002 | Morrison ............ 705/26 |

(Continued)

OTHER PUBLICATIONS

Karen Lundegaard, Auto Retailers Post Gain in Net Aided by Consumer Confidence, New York, Apr. 24, 2002, p. D.5 http://proquest.umi.com/pqdweb?index=31&did=115588787&SrchMode=1%sid=2&Fmt=3&VInst=PROD&VType=PQD&RQT=309&VName=PQD&TS=1199917113&clientId=19649.*

*Primary Examiner*—Jeffrey A. Smith
*Assistant Examiner*—Mila Airapetian
(74) *Attorney, Agent, or Firm*—Dykema Gossett PLLC

(57) ABSTRACT

A system for processing applications from customers for manufacture of vehicle parts is provided. The system includes a server configured to generate an application interface on a customer client in communication with the server through a network. The server is further configured to receive a completed application for manufacture of a part of a vehicle from the customer through the customer client using the application interface. The completed application has information including a first set of information regarding operating conditions of the vehicle, a second set of information defining specifications for the part of the vehicle for which the application to manufacture is being submitted, and a third set of information regarding another part of the vehicle functionally interrelated with said part of the vehicle for which the application for manufacture is being submitted.

32 Claims, 16 Drawing Sheets

U.S. PATENT DOCUMENTS

| | | | |
|---|---|---|---|
| 2002/0046130 A1 | 4/2002 | Monteleone et al. | 705/26 |
| 2002/0099588 A1* | 7/2002 | Utsugi et al. | 705/7 |
| 2003/0004768 A1* | 1/2003 | Bury et al. | 705/7 |
| 2003/0004825 A1* | 1/2003 | Olson et al. | 705/26 |
| 2003/0055812 A1* | 3/2003 | Williams et al. | 707/1 |
| 2003/0115142 A1* | 6/2003 | Brickell et al. | 705/51 |
| 2004/0030614 A1* | 2/2004 | Shields et al. | 705/26 |
| 2004/0095398 A1* | 5/2004 | Muratori et al. | 345/855 |
| 2005/0138216 A1* | 6/2005 | Giles | 710/1 |
| 2005/0187834 A1* | 8/2005 | Painter et al. | 705/28 |

\* cited by examiner

[ New ] [ Applications Sent ] [ Draft Applications ] [ Legacy ] [ Change Password ] [ Reports ] [ Edit Profile ] [ Main Menu ] [ Signout ]

Applications Sent

Pending — 90

In Review     Approved     Conditionally Approved     Not Approved

List Of Applications sent to DANA (4)

| Application No. — 78 | Category — 80 | Date Sent — 82 | Make New Application — 84 | View Engineers Remarks — 86 | View Report — 88 | Delete |
|---|---|---|---|---|---|---|
| AE0006520DA | Drive Axle | Date | New | View | View | ☐ |
| AE0006303DA | Drive Axle | Date | New | View | View | ☐ |
| AE0006275DA | Drive Axle | Date | New | View | View | ☐ |
| AE0006250DA | Drive Axle | Date | New | View | View | ☐ |

(If check box is clicked, all applications will be selected)    ☐ Select all

Delete Checked    [ Delete ]

*People Finding A Better Way*

Terms Of Use (C) 2002 Dana Corporation

FIG. 11

Application Approval Request System
Customer/Section

| New | Applications Sent | Draft Applications | Legacy | Change Password | Reports | Edit Profile | Main Menu | Signout |

Draft Applications

* If the Sr. No. appears with a green background it indicates that application has been completely filled and can be sent to dana.
* Please refer this Application No. as temporary Application No. while you are in draft application list.

List Of Saved (Draft Copies) Applications (5)

| Application No. | Category | Application Date | Status | Delete |
|---|---|---|---|---|
| 2363 ~92 | Brake ~94 | Date ~96 | Partially Filled | ☐ |
| 2353 | Brake | Date | Partially Filled | ☐ |
| 2352 | Steer Axle | Date | Partially Filled | ☐ |
| 2351 | Steer Axle | Date | Partially Filled | ☐ |
| 2338 | Drive Axle | Date | Partially Filled | ☐ |

(If check box is clicked, all applications will be selected) ☐ Select all

Delete Checked | Delete

*People Finding A Better Way*

Terms Of Use (C) 2002 Dana Corporation

List Of Applications Approved (502)

| Application No | Company | Category | Rec'd On | Approval Date | Accepted By | View Report | Action | Owner | Delete |
|---|---|---|---|---|---|---|---|---|---|
| AE00074170A | Kenworth | Drive Axle | Jun-26-2003 | Jun-26-2003 | Carl Meyer | View | Extension | ✓ | ☐ |
| AE00074150A | Kenworth | Drive Axle | Jun-25-2003 | Jun-26-2003 | Carl Meyer | View | Extension | ✓ | ☐ |
| AE00074120A | Kenworth | Drive Axle | Jun-25-2003 | Jun-26-2003 | Carl Meyer | View | Extension | ✓ | ☐ |
| AE00074080A | Kenworth | Drive Axle | Jun-24-2003 | Jun-26-2003 | Carl Meyer | View | Extension | ✓ | ☐ |
| AE00074040A | Kenworth | Drive Axle | Jun-24-2003 | Jun-24-2003 | Carl Meyer | View | Extension | ✓ | ☐ |
| AE00074030A | Kenworth | Drive Axle | Jun-24-2003 | Jun-24-2003 | Carl Meyer | View | Extension | ✓ | ☐ |
| AE00073940A | Kenworth | Drive Axle | Jun-20-2003 | Jun-24-2003 | Carl Meyer | View | Extension | ✓ | ☐ |
| AE00073920A | Kenworth | Drive Axle | Jun-20-2003 | Jun-24-2003 | Carl Meyer | View | Extension | ✓ | ☐ |
| AE00073910A | Kenworth | Drive Axle | Jun-20-2003 | Jun-24-2003 | Carl Meyer | View | Extension | ✓ | ☐ |
| AE00073890A | Kenworth | Drive Axle | Jun-20-2003 | Jun-24-2003 | Carl Meyer | View | Extension | ✓ | ☐ |
| AE00073900A | Kenworth | Drive Axle | Jun-19-2003 | Jun-24-2003 | Carl Meyer | View | Extension | ✓ | ☐ |
| AE00073840A | Kenworth | Drive Axle | Jun-19-2003 | Jun-24-2003 | Carl Meyer | View | Extension | ✓ | ☐ |
| AE00073810A | Kenworth | Drive Axle | Jun-19-2003 | Jun-24-2003 | Carl Meyer | View | Extension | ✓ | ☐ |
| AE00073780A | Kenworth | Drive Axle | Jun-19-2003 | Jun-24-2003 | Carl Meyer | View | Extension | ✓ | ☐ |
| AE00073350SA | Kenworth | Steer Axle | Jun-19-2003 | Jun-24-2003 | Carl Meyer | View | Extension | ✓ | ☐ |

Delete Checked [Delete]

SYSTEM FOR PROCESSING APPLICATIONS FOR MANUFACTURE OF VEHICLE PARTS

BACKGROUND OF THE INVENTION

1. Field of the Invention

This invention relates to the manufacture of vehicle parts and, in particular, to a system for processing applications from customers for manufacture of vehicle parts.

2. Discussion of Related Art

In the past, a customer would typically submit a written application to a vehicle parts manufacturer for manufacture of a vehicle part. This process had numerous drawbacks. For example, the form of the application varied depending on the customer with the customer determining the format of the application and the information that was provided to the manufacturer. Further, the manufacturer had to store the written applications and/or enter the application or its contents into an electronic database thereby consuming valuable resources of the manufacturer.

In recent years, an ever-increasing percentage of business transactions have been made electronically using computing devices communicating with one another over a telecommunications network. These "electronic commerce" systems have provided numerous advantages over prior art business transaction systems including, for example, quicker response time, improved inventory control, and the ability of the customer to track his or her order. Despite the advantages provided by electronic commerce systems, a satisfactory electronic system for processing applications from customers for manufacture of vehicle parts has not yet been developed. Prior attempts have suffered from a number of deficiencies including complex user interfaces, the ability of the customer to manipulate information provided to the manufacturer, and a lack of incentives for customers to use conventional systems.

The inventors herein have recognized a need for a system for processing applications from customers for manufacture of vehicle parts by a manufacturer that will minimize and/or eliminate one or more of the above-identified deficiencies.

SUMMARY OF THE INVENTION

The present invention provides a system for processing applications from customers for manufacture of vehicle parts by a manufacturer.

The inventive system includes a server configured to generate an application interface on a customer client in communication with the server through a network. The first server is further configured to receive a completed application for manufacture of a first part of a vehicle from the customer through the customer client using the application interface. The completed application has information including a first set of information regarding operating conditions of the vehicle, a second set of information defining specifications for the first part, and a third set of information regarding a second part of the vehicle functionally interrelated with the first part of the vehicle.

One embodiment of the inventive system further includes a data structure that associates the completed application with an approval agent. The server is further configured to access the data structure and transmit an application notification to the approval agent upon receipt of the completed application.

In another embodiment of the inventive system, the application interface includes a plurality of tabs having identifiers. Each tab corresponds to a category of requested information regarding the vehicle part for which the application for manufacture is being submitted. The plurality of tabs are displayed simultaneously by the customer client together with one category of requested information selected responsive to a selection of one of the plurality of tabs by the customer through the customer client.

A system in accordance with the present invention has many advantages over conventional systems for processing applications for manufacture of vehicle parts. In general, the inventive system requires fewer resources of the manufacturer and improves efficiency relative to conventional systems. Certain embodiments of the inventive system also provide a user interface that is less complex than conventional systems and produces a standardized application format. Other embodiments automatically route applications to the appropriate approval agent at the manufacturer. Still other embodiments enable customers to store, view, and query prior applications thereby providing incentives to use of the system by customers.

These and other features and objects of this invention will become apparent to one skilled in the art from the following detailed description and the accompanying drawings illustrating features of this invention by way of example.

BRIEF DESCRIPTION OF THE DRAWINGS

FIGS. 3-13 are screen displays illustrating the functionality of the system of FIG. 1.

FIGS. 15-17 are screen displays illustrating the functionality of the system of FIG. 1

DETAILED DESCRIPTION OF EMBODIMENTS OF THE INVENTION

Figure 1:
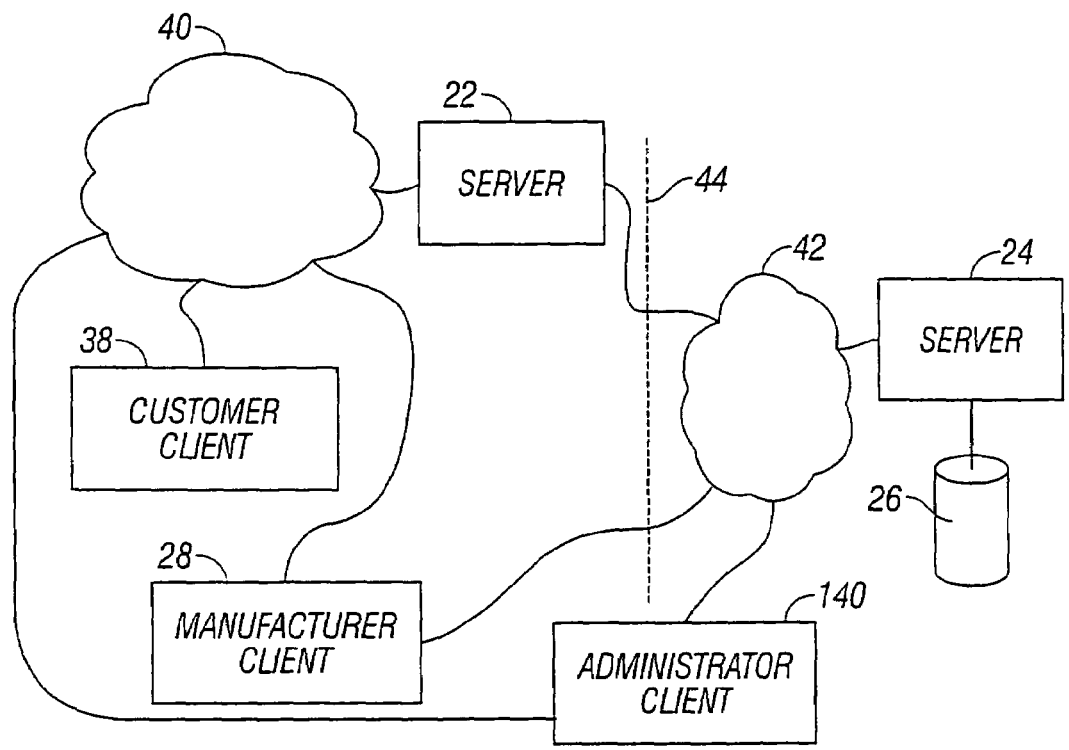
FIG. 1 is a block diagram illustrating a system in accordance with the present invention.

Referring now to the drawings wherein like reference numerals are used to identify identical components in the various views, FIG. 1 illustrates a system 20 for processing applications from customers for manufacture of vehicle parts by a manufacturer in accordance with the present invention. System 20 may include servers 22, 24, a database 26, and a manufacturer client 28.

Figure 2:
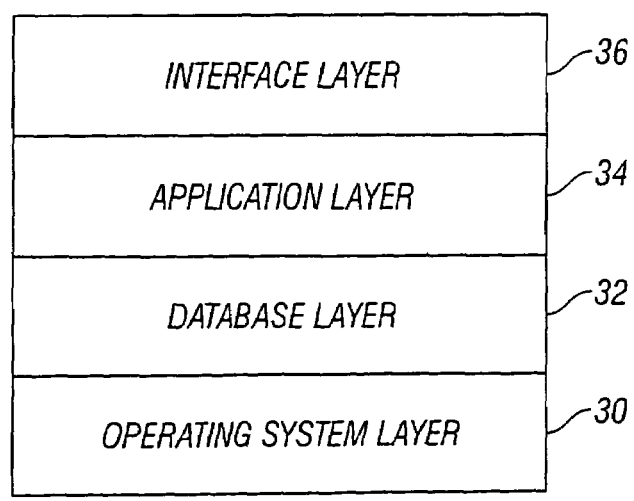
FIG. 2 is a block diagram illustrating the configuration of a portion of the system of FIG. 1.

As used herein, the term "server" refers to a computing device coupled to a network and configured by programming instructions (i.e., software) to manage a set of network resources. Referring to FIG. 2, the architecture of each server 22, 24 may be described as a series of layers including an operating system layer 30, a database layer 32, an application layer 34 and an interface layer 36.

The operating system layer 30 of each server 22, 24 may include a conventional operating system such as one of the operating systems sold under the registered trademark "WINDOWS®" available from Microsoft Corporation of Redmond, Wash. It should be understood, however, that other conventional operating systems such as those based on the Linux or Unix operating systems or operating systems for the Apple computer system (e.g. OS X) may alternatively be used.

The database layer 32 is configured to provide a static and dynamic contact structure for each server 22, 24. Database layer 32 is used to provide both intermediate information while each server 22, 24 executes operations and long-term storage of data. Database layer 32 may employ a database management system (DBMS) such as the DMBS sold under the trademark "SQL SERVER" by Microsoft Corporation of Redmond, Wash.

The application layer 34 is configured to communicate with and between database layer 32 and interface layer 36 and configures the server 22, 24 to perform the functions described in greater detail hereinbelow. Application layer 34 may be implemented using conventional software development components and may further include a combination of Java Script, VB Script and ASP (Active Server Pages) to provide required functionality.

Interface layer 36 provides a graphical and communications interface between the server 22 and clients such as manufacturer client 28. Interface layer 36 may be configured to be Hypertext Markup Language (HTML compliant).

Server 22 may comprise a web server or application server and is in communication with one or more customer clients 38 over a network 40. Each customer client 38 may comprise a conventional computing device such as a personal computer that is preferably equipped with conventional browser software such as the software sold under the trademark "EXPLORER" by Microsoft Corporation of Redmond, Wash. Although only one client 38 is shown in the illustrated embodiment, it should be understood that a plurality of clients 38 can communicate with server 22 over network 40 at any given time. Network 40 enables communication between and among server 22 and client 38. Network 40 may, for example, comprise a local area network (LAN) or wide area network (WAN) and may comprise an intranet or an internet.

In accordance with the present invention server 22 is configured to provide certain functionality. In particular, server 22 provides may be configured to generate, and provides means for generating, an application interface on customer client 38 in communication with server 22 through network 40. Server 22 may also be configured to receive, and provides means for receiving, a completed application for manufacture of a part of a vehicle from the customer through customer client 38 using the application interface. Server 22 may also be configured to authenticate, and provides a means for authenticating, various forms of identification of the customer received through client 38. Sever 22 also may be configured to transmit and receive, and provides a means for transmitting and receiving, a variety of information to and from server 24 and clients 28, 38. These and other possible configurations of server 22 will be described in greater detail hereinbelow with reference to FIGS. 3-17.

Server 24 may comprise a database server managing and controlling access to database 26. Server 24 may be in communication with server 22 over network 40, but is preferably in communication with server 22 over a separate network 42 that may be protected by a firewall 44. Network 42 may comprise a private network such as an intranet and may comprise a local area network (LAN) or wide area network (WAN).

Database 26 is provided to store information and particularly, applications for manufacture of vehicle parts and related information. Database 26 is managed and accessed by server 24.

Manufacturer client 28 may, like customer client 38, comprise a conventional computing device such as a personal computer. Client 28 is preferably equipped with conventional browser software such as the software sold under the trademark "EXPLORER" by Microsoft Corporation of Redmond, Wash. Again, although only one client 28 is shown in the illustrated embodiment, it should be understood that a plurality of clients 28 can communicate with server 22 over network 40 at any given time. As indicated in FIG. 1, client 28 may alternatively communicate with server 22 over network 42.

Figure 3:
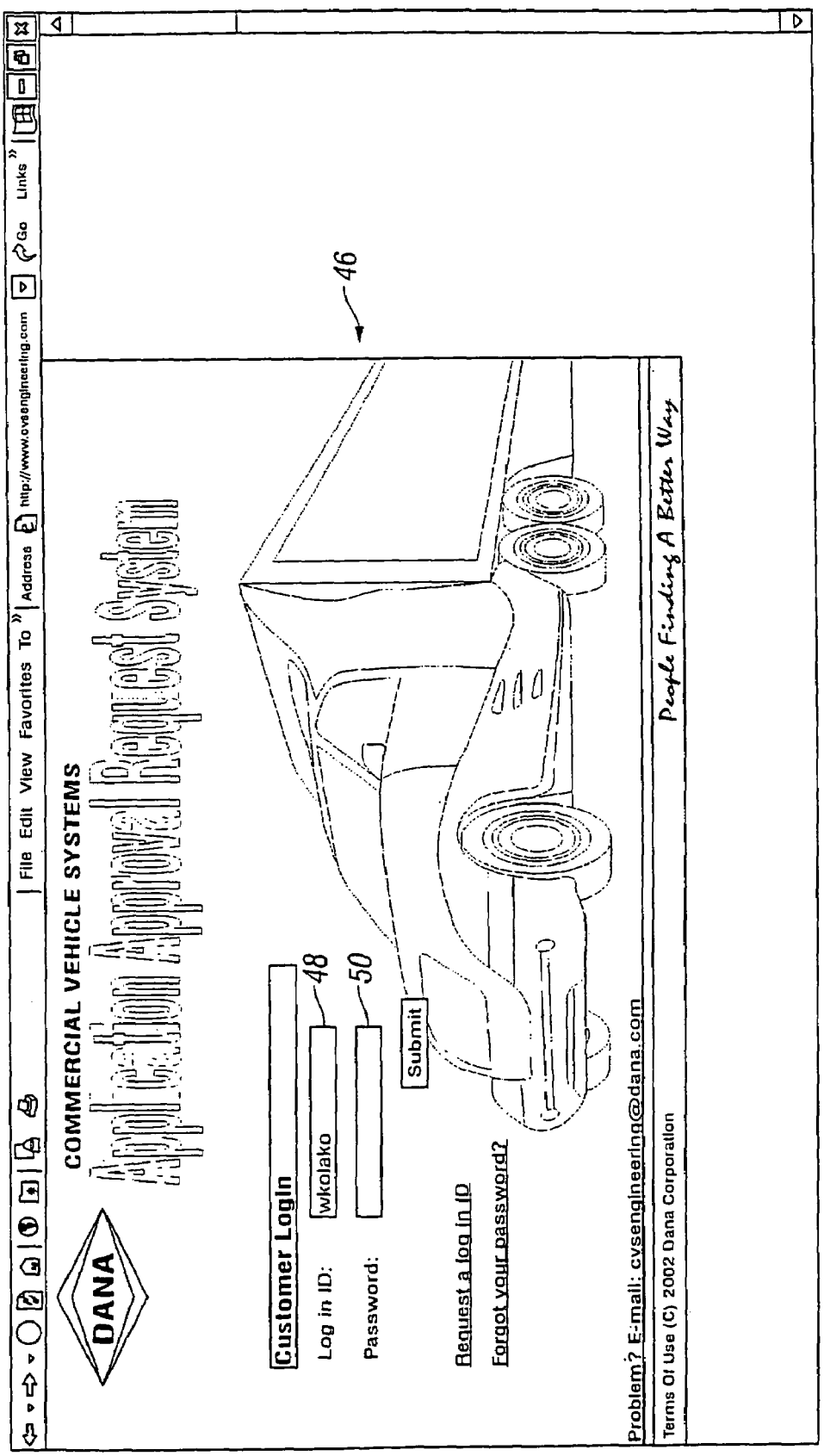

Referring now to FIGS. 3-17, the functionality of system 20 will be described in greater detail. Referring to FIG. 3, server 22 may be configured to generate a graphical and communications interface 46 for the customer responsive to an attempt to access server 22 by the customer using client 38 or by the manufacturer using client 28. The text and graphical display elements of the interface will change responsive to communications with the customer or manufacturer as shown in successive Figures.

Server 22 may also be configured to authenticate, and provides a means for authenticating, multiple forms of identification for the customer or manufacturer received through customer client 38 or manufacturer client 28, respectively, and to verify that one form of identification corresponds to another form of identification. Server 22 may be configured to perform this function prior to communicating with server 24. One form of identification may include, for example, a user identifier 48. The manufacturer, and each customer, may have multiple user identifiers 48 associated with the manufacturer, and customer, respectively to allow multiple end users of the manufacturer and each customer to use system 20. User identifiers 48 may be associated with a manufacturer or a customer within one or more data structures stored in a memory on server 22, such as in the database layer 32 of server 22, or remote from server 22, such as in database 26. The forms of identification may also include a password 50 associated with each end user of the manufacturer and each customer and corresponding to a user identifier 48. Passwords 50 may also be stored in the above-describe data structures with the user identifiers or in separate data structures. The manufacturer or a customer may enter a user identifier 48 and password 50 using interface 46. Upon receiving the user identifier 48 and password 50, server 22 may authenticate the forms of identification in a variety of ways. For example, server 22 may access the above-described data structure and search for a user identifier corresponding to the user identifier 48 provided through client 38. If the identifier provided by the manufacturer or customer is not found, server 22 may refuse further access until a proper user identifier and password are entered. If the identifier provided through client 28 or client 38 is found in the data structure, server 22 may verify that the password provided through client 28 or client 38 is identical to the password found in the data structure linked to that user identifier. The authentication of various forms of identification is one advantage of system 20 because it limits access to a particular customer's information and further prevents one customer from viewing another customer's information thereby promoting customer trust and providing an incentive to use system 20.

Figure 4:
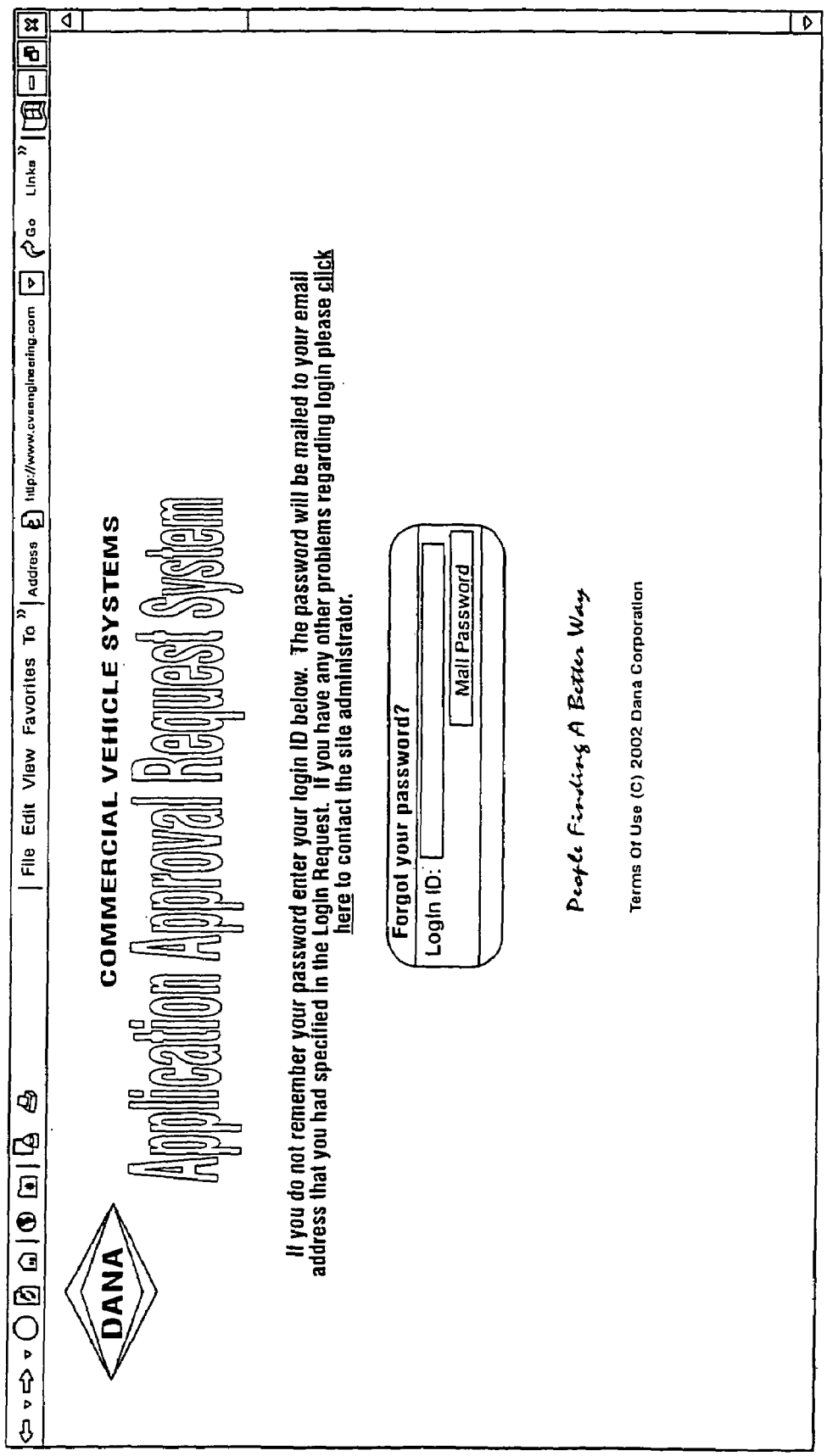

Referring now to FIG. 4, server 22 may further be configured to transmit, and provides a means for transmitting, a second form of identification corresponding to a first form of identification to a predetermined location designated by the manufacturer or customer upon receipt of the first form of identification from the manufacturer or customer through client 28 or client 38, respectively. For example, the predetermined location may comprise an electronic mail address and server 22 may be configured to generate and transmit electronic mail containing a password 48 corresponding to a user identifier 46 provided by the manufacturer or customer to the predetermined location at the request of the manufacturer or customer. In this manner, server 22 enables users to retrieve forgotten passwords 50 in a secure manner without using undue resources of the manufacturer.

Figure 5:
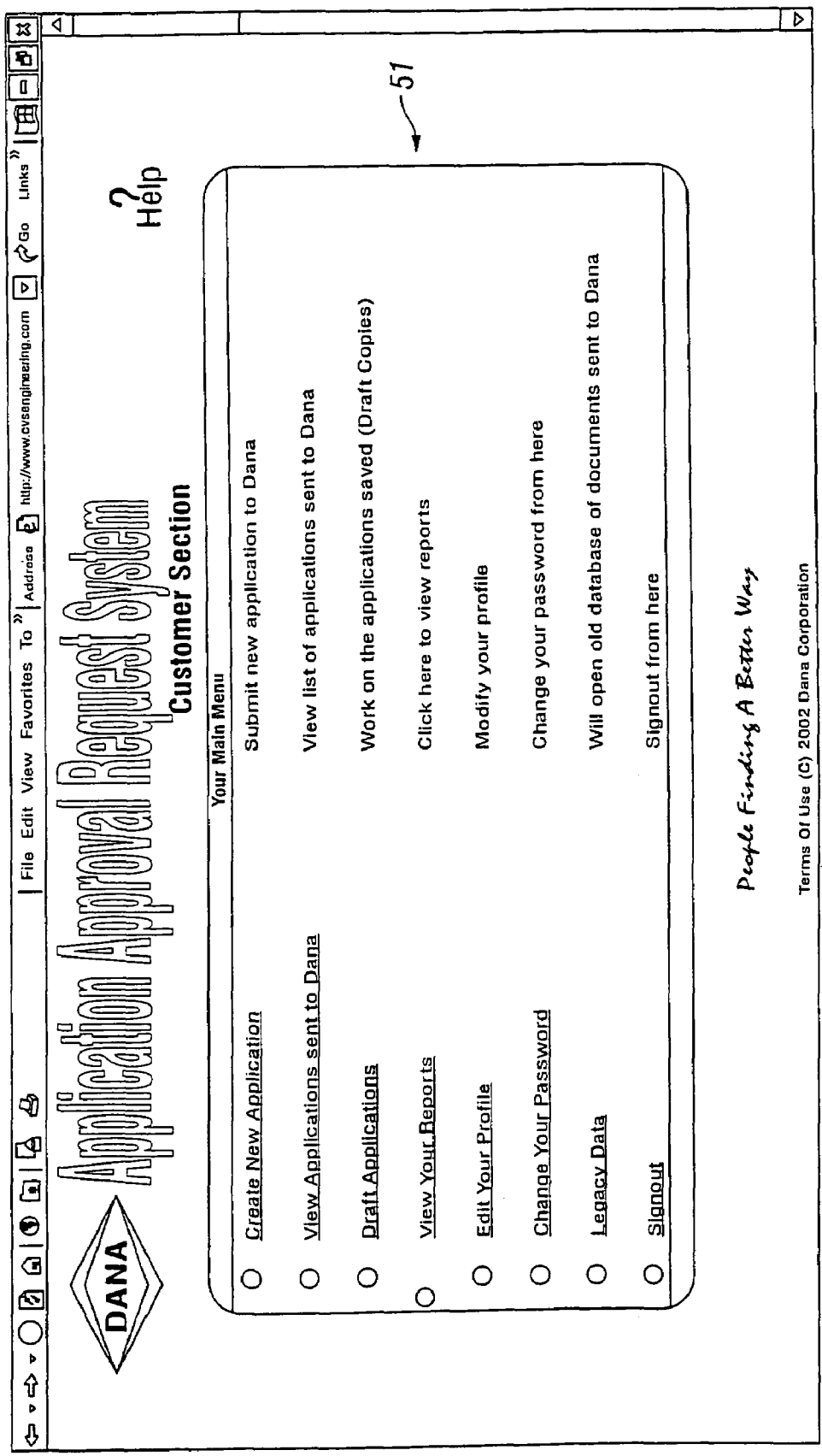

Referring now to FIG. 5, server 22 may be further configured to generate, and provides a means for generating, a customer interface 51 as part of interface 46 following authentication of customer related forms of identification. Interface 51 may include a menu that outlines the functions that can be performed by the customer using system 20. The menu may comprise a plurality of electronic links that direct server 22 to generate various interface configurations. In accordance with the present invention, system 20 can be used by the customer to create an application for manufacture of a vehicle part, review prior incomplete (draft) applications and completed applications and search for specific applications among other tasks.

Figure 6:
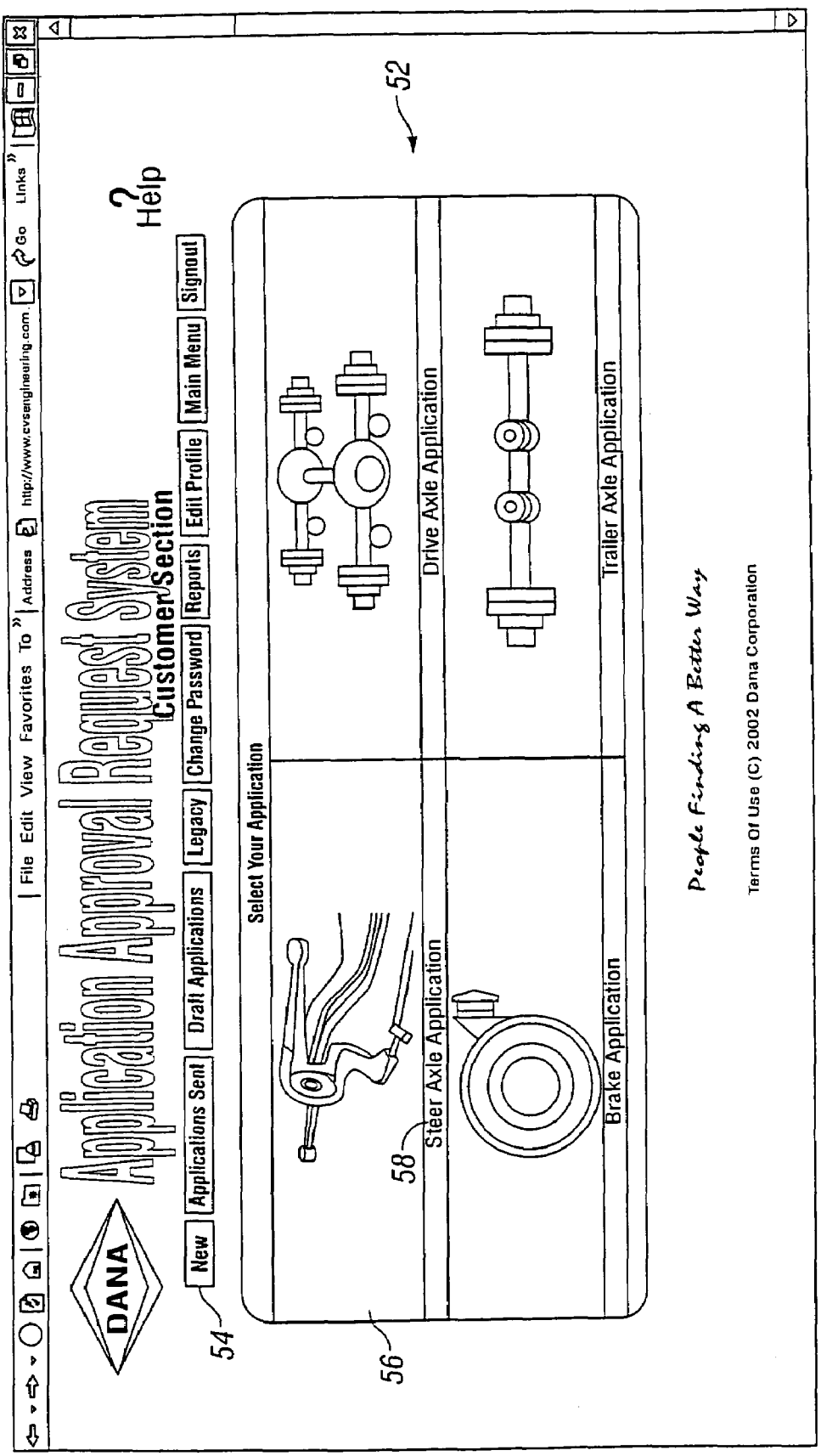

Referring now to FIGS. 6-10, server 22 may be configured in accordance with the present invention to generate, and provides a means for generating, an application interface 52 (as a component of customer interface 51 and the overall graphical and communications interface 46) to allow a customer to create an application for manufacture of a vehicle part using client 38. Server 22 may also be configured to receive, and provides a means for receiving, a completed application from the customer through client 28 using interface 52. Referring to FIG. 6, interface 52 may include a row of buttons 54, icons, or other conventional user interface elements allowing the customer to select one of a plurality of functions. In the illustrated embodiment of the invention, these tasks may be described in general terms as follows: "New"—create a new application for manufacture of a vehicle part; "Applications Sent"—view prior completed applications for manufacture of vehicle parts submitted to the manufacturer; "Draft Applications"—view prior incomplete applications prepared by the customer; "Legacy"—view prior completed applications submitted to the manufacturer prior to the introduction of system 20; "Change Password"—change the password 50 corresponding to a user identifier 48; "Reports"—run a search for applications meeting specified criteria; "Edit Profile"—change information associated with a user identifier 48 (e.g., name, street address, e-mail address, phone number, etc); "Main Menu"—return to the menu set forth in FIG. 5; and "Signout"—log off system 20. In the illustrated embodiment, buttons 54 are disposed in a single row along the top of the screen display. It should be understood, however, that the arrangement of buttons 54 within interface 52 could be varied. Application interface 52 may further include a series of illustrations 56 with text identifiers 58 corresponding to various vehicle parts. In one constructed embodiment of the invention, the vehicle parts for which an application for manufacture may be made comprise steer axles, drive axles, trailer axles and brakes. Using interface 52 through client 38, the customer can select one of the illustrations 56 and/or text identifiers 58 either or both of which may act as electronic links to additional portions of interface 52.

Figure 7:
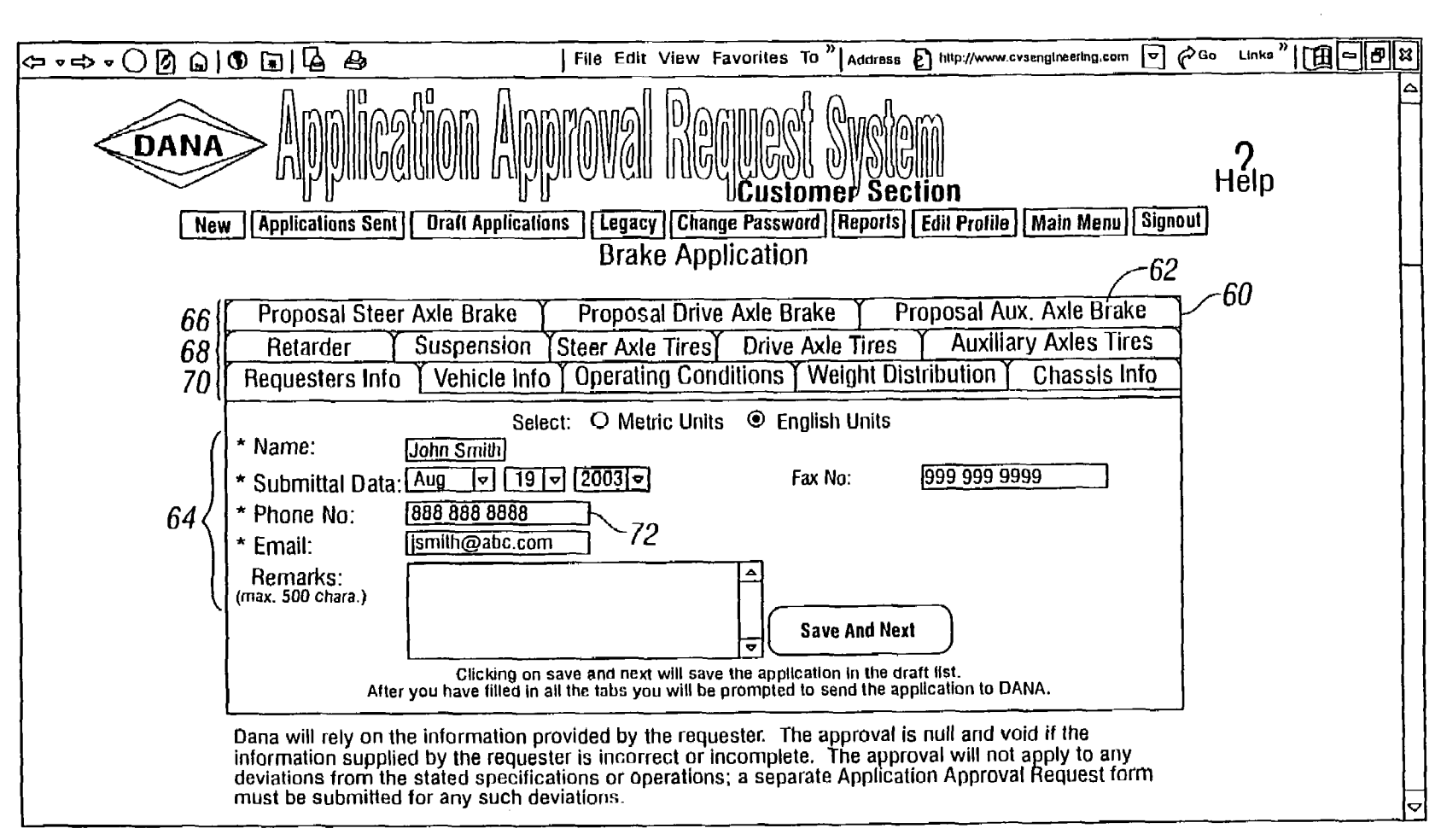
Figure 9:
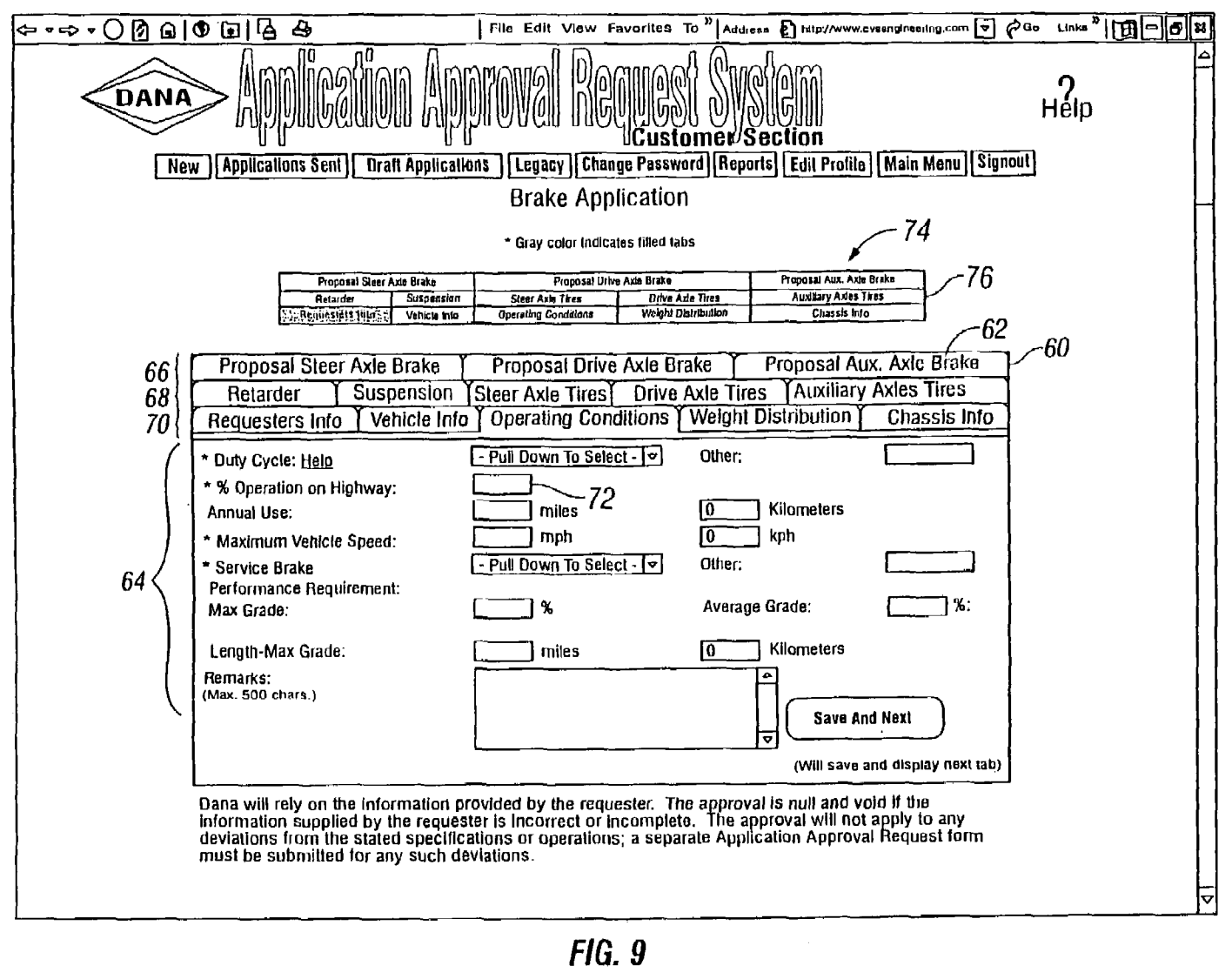

Referring now to FIG. 7, interface 52 may further include a plurality of tabs 60 having identifiers 62. The identifiers may include letters, numbers, other typographical symbols and/or graphical and pictorial elements. Each tab 60 may correspond to a category of requested information 64 regarding the vehicle part for which an application is being created. In one embodiment of the invention, the interface 52 displays all of the tabs 60 simultaneously on client 38 together with one category 64 of requested information as shown in FIG. 7. The displayed category is selected by the customer through client 38 using interface 52 by selecting one of tabs 60. Interface 52 may alter the appearance of the selected tab relative to the unselected tabs by, for example, altering the color of the selected tab thereby clearly identifying the category of requested information with which the customer is working. In the illustrated embodiment, tabs 60 are displayed in a plurality of rows 66, 68, 70 with each row 66, 68, 70 containing a plurality of tabs 60. Tabs 60 containing similar identifiers and/or related categories 64 of requested information (e.g., "Steer Axle Tires", "Drive Axle Tires" and "Auxiliary Axle Tires") may also be grouped together within one or more of rows 66, 68, 70. Referring to FIG. 9, interface 52 may reorder rows 66, 68, 70 responsive to a customer's selection of a tab 60 and/or category 64 of requested information. In the illustrated embodiment, the row containing the selected tab 60 and/or category 64 of requested information is displayed on the screen as the bottommost row thereby maintaining the visibility of all of the tabs 60. It should be understood, however, that the other arrangements may be possible. The logical categorization of requested information, the display of all of tabs 60 together with only one category 64 of requested information, and the arrangement of tabs 60 each promote ease of use by the customer, complete and accurate entry of the requested information to the benefit of the manufacturer, and further provide incentives to use of the system by the customer.

Referring again to FIG. 7, each category 64 of requested information includes a plurality of fields 72. Certain fields 72 may have default values or a limited range of values from which the customer may select (e.g., see "Submittal Date" in FIG. 7). Certain fields 72 may also enable the user to select from one of a plurality of values using a menu, such as a conventional pull-down menu (e.g., see "Submittal Date" in FIG. 7), thereby improving efficiency in preparing the application and standardization of the application format. Server 22 may also be configured to generated, and provides a means for generating, a notification to the customer when the customer selects a new category 64 of requested information and a value in a field 72 of a previously selected category 64 of requested information fails to meet a predetermined condition (e.g, when a required field 72 is left blank or a value entered falls outside of an acceptable range of values). Server 22 may also be configured to generate, and provides a means for generating, a value for a field 72 responsive to receipt of a value for another field 72 from client 38. Server 22 may generate the value for a field 72 in the same category 64 of requested information for which server 22 has received a value from client 38 or in a different category 64 of requested information. The term "value" as used herein is not limited to numeric values, but may include text, logical relationships, etc. The range of "values" will be dependent on the information requested in a particular field 72.

Figure 8:
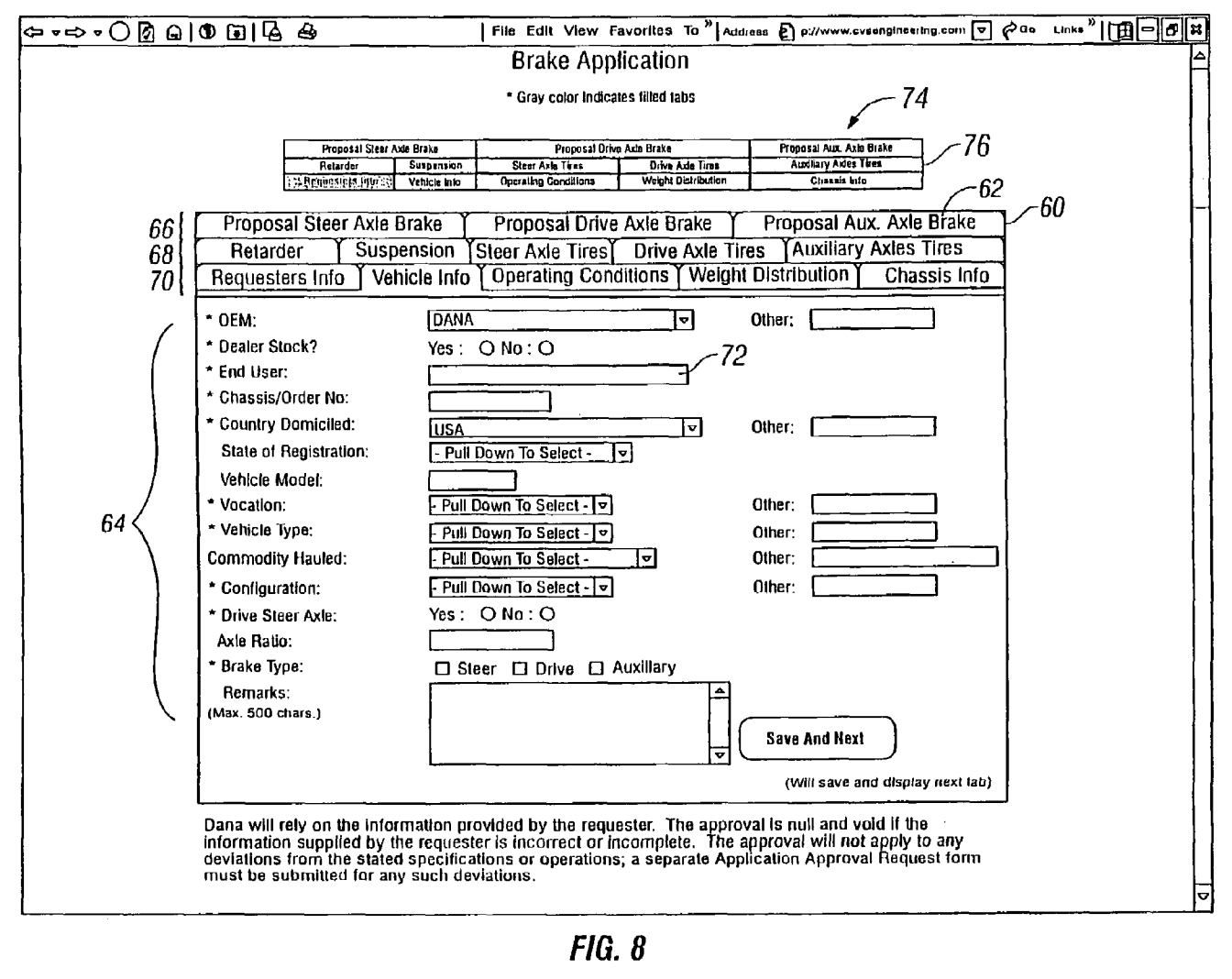

Referring now to FIG. 8, interface 52 may further include an indicator 74 that indicates, simultaneously for each of the categories 64 of requested information, whether server 22 has received all of the requested information in the category 64 of requested information. In the illustrated embodiment, the indicator 74 includes a plurality of members 76 corresponding to the plurality of tabs 60. Members 76 may have the same identifiers as tabs 60 and may be ordered in the same manner as tabs 60. For example, in the illustrated embodiment, members 76 are organized into the same number of rows as tabs 60 with each row containing a subset of members 76 having identifiers identical to, and in the same left to right order, as a corresponding row of tabs 60. Server 22 uses indicator 74 to indicate whether all of the requested information in a category 64 of requested information has been received by altering the appearance of a member 76 corresponding to a tab 60. For example, server 22 may alter the color of one or members 76 to illustrate that all of the requested information in a specified tab 60 and/or category 64 has been received.

Figure 10:
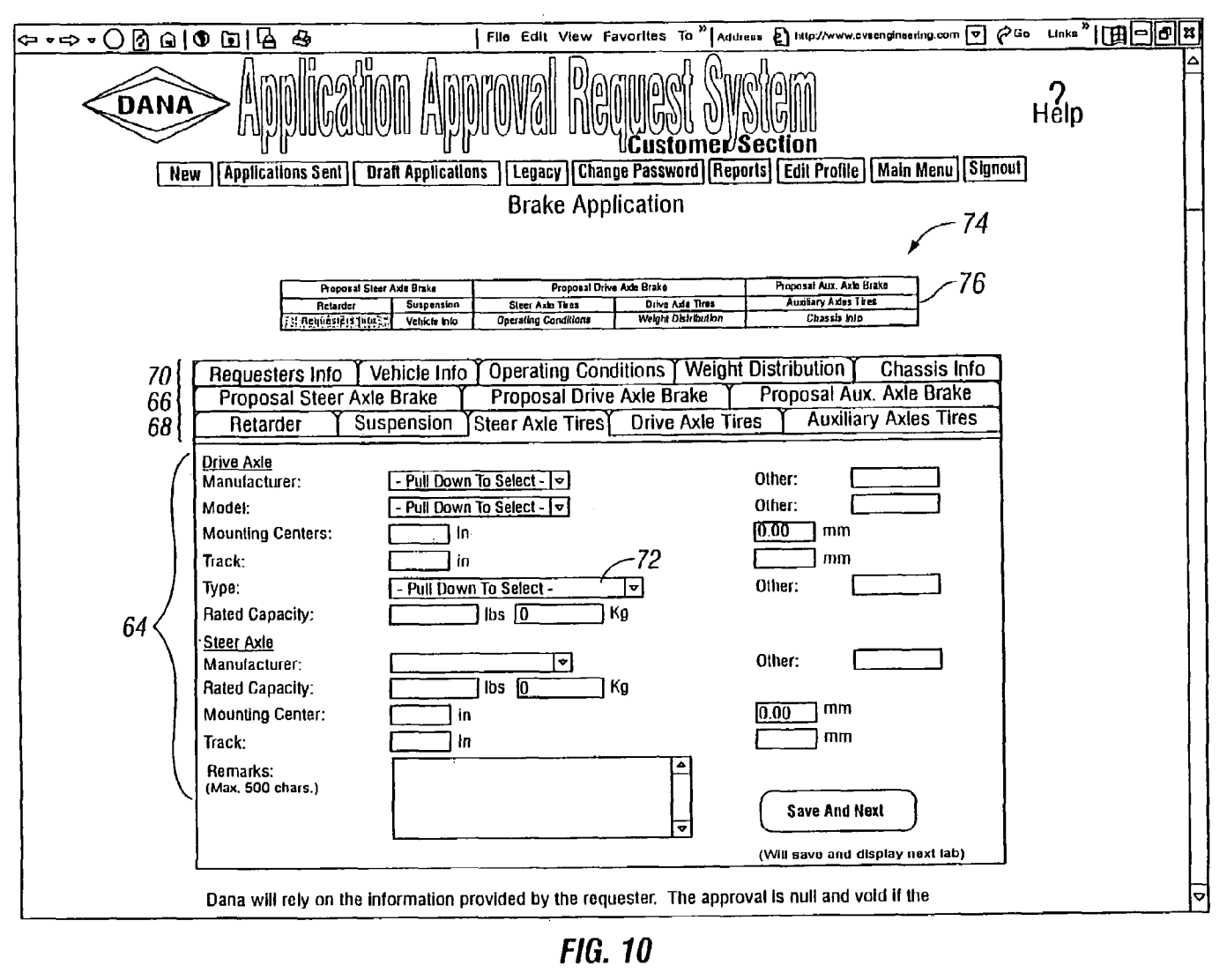

Referring now to FIGS. 7-10, a completed application received by server 22 will include a variety of information received from the customer through the application interface 52. In accordance with the present invention, the information will include a first set of information regarding operating conditions of the vehicle on which the vehicle part will be installed, a second set of information defining specifications for the vehicle part for which the application for manufacture is being submitted, and a third set of information regarding one or more additional vehicle parts that are functionally interrelated with the vehicle part for which the application for manufacture is being submitted. As used herein the term "functionally interrelated" means that one vehicle part cooperates with another vehicle part during operation of the vehicle and/or has structural or functional specifications dependent upon specifications of the other vehicle part. As shown in FIG. 9, operating conditions of the vehicle may include, for example only, the percent of operation on highways as illustrated. As shown in FIG. 8, information regarding the vehicle part may include, for example only, the type of brake where the vehicle part for which an application for manufacture is being submitted comprises a brake. Finally, as shown in FIG. 10, information regarding related vehicle parts may include, again for example only, information regarding a vehicle's suspension where the vehicle part for which an application for manufacture is being submitted comprises a brake. It will be understood that the type of information requested regarding the operating conditions of the vehicle, the vehicle part for which an application for manufacture is being submitted, and interrelated vehicle parts will vary depending on the particular vehicle part for which manufacture is sought.

Referring now to FIGS. 11-12, server 22 may be configured to transmit to client 38, and provides a means for transmitting to client 38, electronic links to prior applications of the customer responsive to a request received from the customer through client 38. Referring to FIG. 5, server 22 may be configured to generate, and provides a means for generating, the screen display shown in FIG. 11—wherein the prior applications comprise completed applications—in response to customer selection of "View Applications Sent to Dana". Server 22 may be configured to generate, and provides a means for generating, the screen display shown in FIG. 12—wherein the prior applications comprise incomplete applications—in response to customer selection of "Draft Applications".

Referring to FIG. 11, interface 46 may include a list of applications organized in a row and column format wherein each row includes information regarding a prior completed application of the customer. In the illustrated embodiment, each row may include: an electronic link 78 to an application identified by the column header "Application No."; a descriptive identifier 80 of the "Category" of the vehicle part that is the subject of the application; the date 82 the application was submitted (i.e. "Date Sent"); a button 84, icon, or other conventional interface element under the heading "Make New Application" for a purpose described below; an electronic link 86 to remarks by the manufacturer under the heading "View Engineer's Remarks"; and an electronic link 88 to a text version of the application under the heading "View Report".

The interface 46 may further include one or more status indicators 90. In the illustrated embodiment, these indicators 90 are arranged in a row proximate the top of the screen display. It should be appreciated, however, that other arrangements are possible. Server 22 may be configured to generate, and provides a means for generating, an indication of the status of a completed application using indicators 90. In particular, server 22 may give a different appearance to each indicator 90. For example, the indicators 90 may each be displayed in a different color. Further, each of the links 78 may be given the same appearance as one of the status indicators 90. For example, each of links 78 may be displayed in a color wherein the color of the link 78 corresponds to the status indicated by the indicator 90 having the same color.

Server 22 may be further configured to create, and provides a means for creating a new application for manufacture of a vehicle part by copying a prior application responsive to a request received from client 38. In particular, a customer may select the button 84 and server 22 may generate application interface 52 (see FIG. 7) with the values in the fields 72 in each category of requested information 64 having the values found in the prior application.

Server 22 may also be configured to order the electronic links 78 (and rows), and provides a means for ordering the electronic links 78 (and rows) in accordance with one of a plurality of criteria selected by the customer through client 38. In one embodiment of the invention, one of more of the column headings set forth a different criteria for ordering the applications. For example, the customer may select "Date Sent" to order the applications chronologically. In the illustrated embodiment, the links 78 may be ordered based on an identifying number assigned to the application, the category of the vehicle part for which the application for manufacture was submitted, or the date the application was approved.

Referring to FIG. 12, the interface 46 may also include a list of prior incomplete applications organized in a row and column format wherein each row includes information regarding a prior completed application of the customer. In the illustrated embodiment, each row may include: an electronic link 92 to an application identified by the "Application No."; a descriptive identifier 94 of the "Category" of the vehicle part that is the subject of the application; and the date 96 the application was begun by the customer. Server 22 may also again be configured to order, and provides a means for ordering, the electronic links 92 (and rows) in accordance with one of a plurality of criteria selected by the customer through client 38. In one embodiment of the invention, one of more of the column headings again sets forth a different criteria for ordering the applications.

Figure 13:
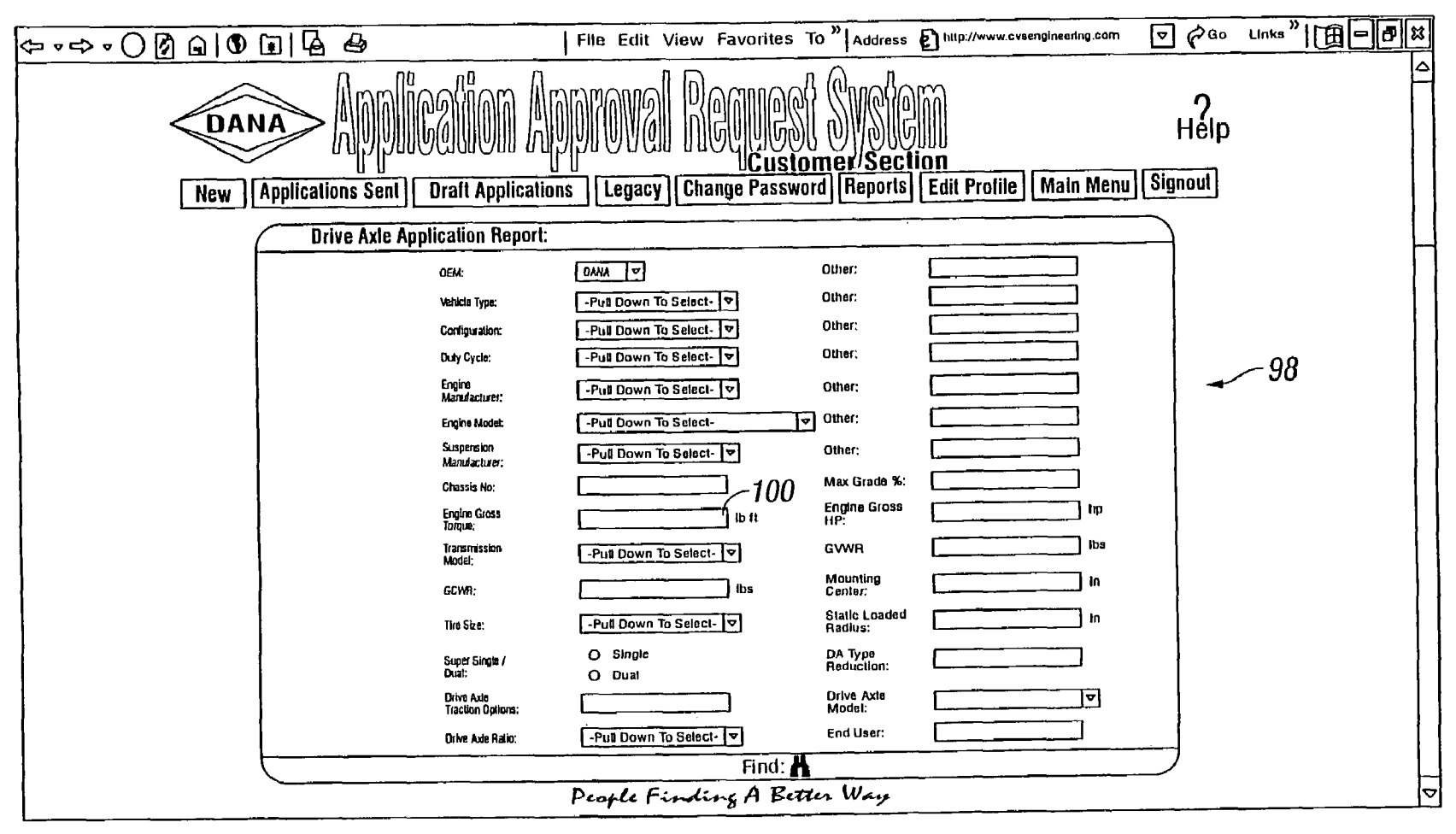

Referring now to FIG. 13, server 22 may also be configured to transmit to client 38, and provides means for transmitting to client 38, electronic links to a subset of prior applications of the customer responsive to a request received from client 38. The subset is created responsive to search data provided by the customer through a search interface 98 (which forms a component of customer interface 52 and the overall graphical and communications interface 46). Interface 98 may be initially configured by server 22 responsive to selection of a type of vehicle part for which the customer wishes to retrieve applications. In the illustrated embodiment, server 22 has configured interface 98 with fields 100 used to search for applications for manufacture of drive axles. Select fields 100 may have default values or a limited range of values from which the customer may select (e.g., see "Vehicle Type" in FIG. 13). Certain fields 100 may also enable the user to select from one of a plurality of values using a menu, such as a conventional pull-down menu (e.g., see "Vehicle Type" in FIG. 13), thereby improving efficiency in preparing the application and standardization of the application format. Server 22 may also be configured to transmit, and provides a means for transmitting, a notification to client 38 prior to initiating the search whenever the value in a field 100 fails to meet a predetermined condition (e.g, when a required field is left blank or a value entered falls outside of an acceptable range of values). Server 22 may also be configured to generate, and provides means for generating, a value for a field 100 responsive to receipt of a value for another field 100 from client 38. The term "value" as used herein is again not limited to numeric values, but may include text, logical relationships, etc. The range of "values" will be dependent on the information requested in a particular field 100. The data received responsive to the search may be extracted to a conventional spreadsheet program such as the program sold under the trademark "EXCEL" by Microsoft Corporation of Redmond, Wash.

Figure 14:
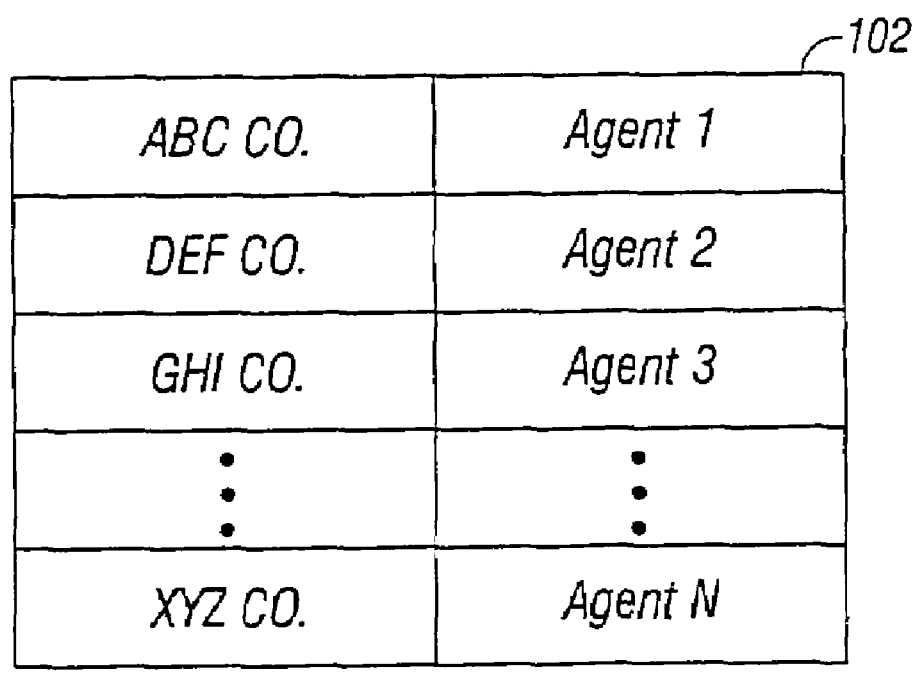
FIG. 14 is a block diagram illustrating a data structure used by the system of FIG. 1.

Referring again to FIG. 1, upon receipt of a completed application from a customer, server 22 may be configured to transmit, and provides means for transmitting, an application notification to manufacturer client 28 upon receipt of the completed application. In one embodiment of the invention, the notification may comprise electronic mail with an electronic link to the application. Referring to FIG. 14, in accordance with one embodiment of the invention, system 20 may include a data structure 102 that associates an application for manufacture of a vehicle part with an approval agent of the manufacturer. In a preferred embodiment, the approval agent comprises a human being representing the manufacturer designated to evaluate completed applications. The approval agent could alternatively comprise, however, a programmed computer. Server 22 is configured to access, and provides means for accessing, data structure 102 using information associated with the application and is configured to transmit, and provides means for transmitting, an application notification to an approval agent. In the illustrated embodiment, data structure 102 associates the application with an approval agent based on the identity of the customer although it should be understood that other means for associating the application with an approval agent (e.g., type of vehicle part) could also be used. Server 22 may use customer related information (e.g., company name, address, contact person) in the completed application to access data structure 102 and identify the corresponding approval agent. The automatic routing of applications to an appropriate approval agent is an advantage of system 20 because it promotes quicker evaluation of customer applications by the appropriate manufacturer representative. Server 22 may also alternatively be configured to transmit, and provides means for transmitting, an approval notification to the customer through client 38 if the information in the completed application meets predetermined conditions and to transmit an application notification to an approval agent only if the information in the completed application does not meet the predetermined conditions. In this manner system 20 enable more rapid review of customer applications thereby providing additional incentives to use of system 20 while reducing the draw on manufacturer resources.

Figure 15:
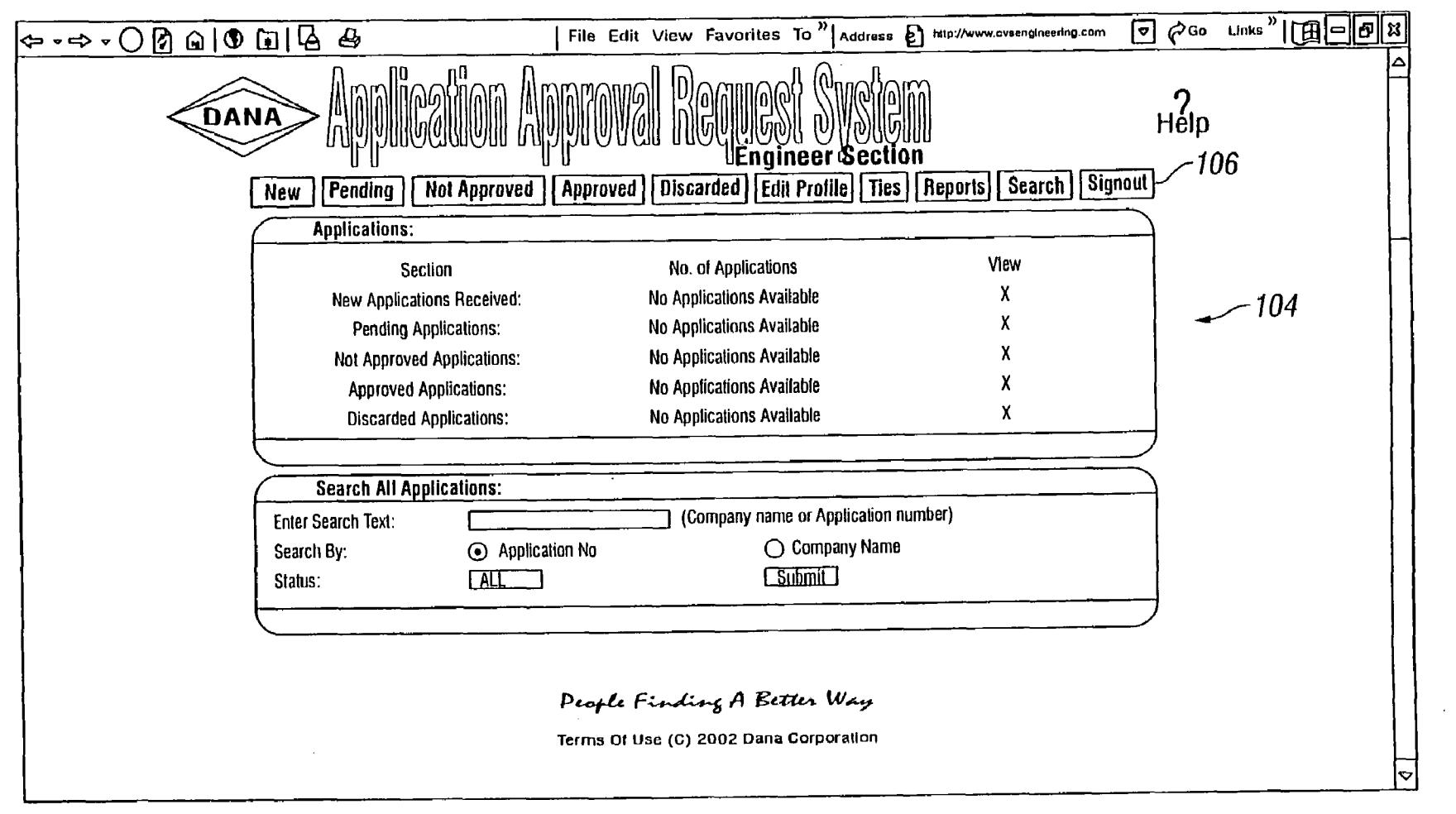

Referring now to FIGS. 15-16, server 22 may be further configured to generate, and provides means for generating, a graphical and communications interface 104 for an approval agent or other representative of the manufacturer responsive to an attempt to access server 22 by an approval agent or other representative of the manufacturer using client 28. The text and graphical display elements of interface 104 will change responsive to communications with the customer as shown in successive Figures.

Interface 104 may include a row of buttons 106, icons, or other conventional user interface elements allowing the manufacturer to select one of a plurality of tasks. In the illustrated embodiment of the invention, these tasks may be described in general terms as follows: "New"—view completed applications for manufacture of a vehicle part that have not yet been viewed; "Pending"—view previously viewed completed applications on which no decision has been made by the manufacturer; "Not Approved"—view prior completed applications which have been denied by the manufacturer; "Approved"—view prior completed applications which have been approved by the manufacturer; "Discarded"—view prior completed applications that have been abandoned; "Edit Profile"—change information associated with an approval agent of the manufacturer (e.g., name, street address, e-mail address, phone number, etc); "Ties"—view relationships among multiple submitted applications as designated by a customer; "Reports"—run a search for applications meeting specified criteria; "Search"—run a search for applications meeting specified criteria; "Signout"—log off system 20. In the illustrated embodiment, buttons 106 are disposed in a single row along the top of the screen display. It should be understood, however, that the arrangement of buttons 106 could be varied.

Figure 17:

Referring to FIGS. 16-17, server 22 may be configured to transmit, and provides means for transmitting, to an approval agent of manufacturer through client 28, responsive to a request received from through client 28, electronic links to completed applications associated with the approval agent. Server 22 may be configured to generate, and provides means for generating, the screen display shown in FIG. 16 responsive to selection of the button 106 labeled "Approved". Server 22 may be configured to generate, and provides means for generating, the screen display shown in FIG. 17 responsive to a search performed by the approval agent using the interface shown in FIG. 15 generated responsive to selection of the button 106 labeled "Search" (from which the manufacturer representative may search for applications of any customer—unlike the customers themselves). The resulting screen displays of interface 104 include a list applications organized in a row and column format wherein each row includes information regarding a prior completed application of a customer. In the embodiment illustrated in FIG. 16, each row may include: an electronic link 108 to an application identified by the "Application No."; the identify 110 of the customer submitting the application under the heading "Company"; a descriptive identifier 112 of the "Category" of the vehicle part that is the subject of the application; the date 114 the application was submitted (i.e. "Recd On"); the date 116 on which the application was approved (i.e., "Approval Date"); the identity 118 of the approval agent; an electronic link 120 to a text version of the application under the heading "View Report"; and an electronic link 122 to a text version of the completed application. In the embodiment illustrated in FIG. 17, each row may include: an electronic link 124 to an application identified by the "Application No."; the identify 126 of the customer submitting the application under the heading "Company"; a descriptive identifier 128 of the "Category" of the vehicle part that is the subject of the application; the identity 130 of the approval agent for the application under the heading "Engineer"; the date 132 the application was submitted (i.e. "Application Received Date"); an electronic link 134 to a text version of the application under the heading "View"; and a status identifier 136 under the heading "Status".

Server 22 may also be configured to order, and provides means for ordering, the electronic links 108 or 124 (and rows) in accordance with one of a plurality of criteria selected by the manufacturer through client 28. In one embodiment of the invention, one of more of the column headings sets forth a different criteria for ordering the applications. For example, the manufacturer may select "Recd On" in the screen display shown in FIG. 16 to order the applications chronologically. In the illustrated embodiments, the links 108 and 124 may be ordered based on an identifying number assigned to the application, the identity of the customer submitting the application, the category of the vehicle part for which the application for manufacture was submitted, or the date on which the application was received. Referring to FIG. 17, server 22 may be configured to export, and provides means for exporting, some or all of the information shown in FIG. 17 to a spreadsheet responsive to actuation of a button 138, icon or other conventional interface element and using a conventional spreadsheet software program such as the program sold under the trademark "EXCEL" by Microsoft Corporation of Redmond, Wash.

Server 22 may also be configured to generate, and provides means for generating, a notification to an approval agent or other representative of the manufacturer requesting entry of information where the manufacturer representative modifies a completed application received from a customer. Server 22 may be further configured to prevent, and provides means for preventing, the manufacturer representative from exiting the application without entry of the information.

Referring to FIG. 1, server 22 may be further configured to generate an approval notification to a customer after review of the application by the manufacturer and responsive to an indication (e.g., actuation of a button (not shown) or other interface element in interface 104) of an approval or a denial by the approval agent of the manufacturer using client 28. The approval notification may be sent, for example, over network 40 to client 38 and may comprise electronic mail. The approval notification may also contain an electronic link to the completed application and/or comments of the approval agent.

System 20 may further include an administrator client 140 in communication with server 22 over network 40 or network 42. Server 22 may be configured to generate an administrative interface allowing an administrator to perform conventional administrative tasks such as reviewing requests for user identifiers 48, managing existing user identifiers 48 including linking user identifiers to customers, and modifying data structure 102 to link applications to approval agents of the manufacturer.

A system for processing applications for manufacture of vehicle parts in accordance with the present invention represents an improvement over prior art systems. The use of a programmed server 22, eliminates the need for written applications for manufacture of vehicle parts. As a result, the inventive system 20 requires fewer resources of the manufacturer and improves efficiency relative to conventional systems. The inventive system also standardizes the application format and ensures receipt of required and accurate data from customers by the manufacturer.

Other aspects of the inventive system found in various embodiments of the invention provide further advantages. The authentication of various forms of identification by server 22 allows multiple end users for one customer, but also prevents a customer from accessing applications of another customer. This feature provides a further incentive to use of system 20 by customers. The application interface 52 of system 20 is significantly less complex than conventional systems and easy to use thereby providing incentives for customers to use system 20. The interface 52 also promotes a standardized application format to the benefit of the manufacturer. The ability of the customer to copy existing applications to create new applications provides an additional incentive to customer use and promotes efficiency in the application process. The inventive system 20 further creates and maintains a permanent and easily accessible and searchable database of applications to the benefit of the customer and the manufacturer. System 20 also is capable of automatically routing applications to the appropriate approval agent thereby promoting a more efficient application process.

While the invention has been shown and described with reference to one or more particular embodiments thereof, it will be understood by those of skill in the art that various changes and modifications can be made without departing from the spirit and scope of the invention.

We claim:

1. A system for processing applications from customers for manufacture of vehicle parts by a manufacturer, comprising:
   a first server configured to generate an application interface on a customer client in communication with said first server through a first network and to receive a first completed application for manufacture of a first part of a vehicle from said customer through said customer client using said application interface, said first completed application having information including a first set of information regarding operating conditions of said vehicle, a second set of information defining specifications for said first part, and a third set of information regarding a second part of said vehicle functionally interrelated with said first part of said vehicle;
   wherein said first server is further configured to transmit to said customer client, responsive to a request received from said customer client, electronic links to prior applications of said customer and to order said electronic links in accordance with one of a plurality of criteria selected by said customer through said customer client.

2. The system of claim 1, further comprising:
   a second server in communication with said first server over one of said first network and a second network; and,
   a database that stores said information, said database accessible by said second server.

3. The system of claim 2 wherein said second network comprises an intranet.

4. The system of claim 1, further comprising a data structure that associates said first completed application with an approval agent, said first server further configured to access said data structure and transmit an application notification to said approval agent upon receipt of said completed application.

5. The system of claim 4 wherein said data structure associates said application with said approval agent based on an identity of said customer.

6. The system of claim 4 wherein said application notification includes an electronic link to said first completed application.

7. The system of claim 1 wherein said first server is further configured to transmit an approval notification to said customer client if said information in said first completed application meets predetermined conditions and to transmit an application notification to an approval agent if said information in said first completed application does not meet said predetermined conditions.

8. The system of claim 1 wherein said first server is further configured to authenticate first and second forms of identification for said customer received from said customer client and that said first form of identification corresponds to said second form of identification.

9. The system of claim 8 wherein said first server is further configured to transmit said second form of identification corresponding to said first form of identification to a predetermined location designated by said customer upon receipt of said first form of identification from said customer through said customer client.

10. The system of claim 1 wherein said application interface includes a plurality of tabs having identifiers, each tab of said plurality of tabs corresponding to a category of requested information from among a plurality of categories of requested information regarding said first part of said vehicle, said plurality of tabs displayed simultaneously by said customer client together with one category of requested information from said plurality of categories of requested information, said one category of requested information selected responsive to a selection of one of said plurality of tabs by said customer through said customer client.

11. The system of claim 10 wherein said plurality of tabs are displayed in a plurality of rows, each row of said plurality of rows containing at least two tabs of said plurality of tabs.

12. The system of claim 10 wherein each category of said plurality of categories of requested information includes at least one field and said first server is further configured to generate a notification to said customer when said customer selects a new category of requested information and a value in a field of a previously selected category of requested information fails to meet a predetermined condition.

13. The system of claim 10 wherein each category of said plurality of categories of requested information includes at least one field and said first server is further configured to generate a first value for a first field responsive to receipt of a second value for a second field from said customer client.

14. The system of claim 13 wherein said first field and said second field are both in a single category of requested information among said plurality of categories of requested information.

15. The system of claim 13 wherein said first field and said second field are in different categories of requested information among said plurality of categories of requested information.

16. The system of claim 10 wherein at least one category of said plurality of categories of requested information includes at least one field and said at least one field includes a menu offering a plurality of possible values for said at least one field.

17. The system of claim 10 wherein said application interface includes an indicator indicating, simultaneously for each of said plurality of categories of requested information, whether said first server has received all requested information in said category of requested information.

18. The system of claim 17 wherein said indicator displays one of two colors for each of said plurality of categories of requested information.

19. The system of claim 17 wherein said indicator includes a plurality of members corresponding to said plurality of tabs, said plurality of members ordered in the same manner as said plurality of tabs.

20. The system of claim 1 wherein said vehicle part is one of a steer axle, a drive axle, a trailer axle and a brake.

21. The system of claim 1 wherein said first server is further configured to transmit to said customer client, responsive to a request received from said customer client, an electronic link to a prior application of said customer.

22. The system of claim 21 wherein said prior application comprises a second completed application.

23. The system of claim 21 wherein said prior application comprises an incomplete application.

24. The system of claim 21 wherein said first server is further configured, responsive to a request received from said customer client, to create a new application by copying said prior application.

25. The system of claim 1 wherein said first server is further configured to transmit an approval notification to said customer upon review of said first completed application by an approval agent of said manufacturer.

26. The system of claim 25 wherein said approval notification includes an electronic link to said first completed application.

27. The system of claim 1 wherein said first server is further configured to transmit to said customer client, responsive to a request received from said customer client, electronic links to a subset of prior applications of said customer, said subset created responsive to search data provided by said customer.

28. The system of claim 1, further comprising a manufacturer client in communication with said first server over one of said first network and a second network.

29. The system of claim 28 wherein said first server transmits an application notification to said manufacturer client upon receipt of said first completed application.

30. The system of claim 29 wherein said application notification includes an electronic link to said first completed application.

31. The system of claim 28 wherein said first server is further configured to transmit to said manufacturer client first and second electronic links to said first completed application and a second completed application, respectively, each of said first and second completed applications associated with an approval agent.

32. The system of claim 31 wherein said first server is further configured to order said first and second electronic links in accordance with one of a plurality of criteria selected by said approval agent through said manufacturer client.

* * * * *